United States Patent [19]
Bishop

[11] Patent Number: 6,034,855
[45] Date of Patent: Mar. 7, 2000

[54] METHOD AND APPARATUS FOR ATTENUATION OF, AND DAMAGE PROTECTION FROM, HIGH ENERGY ELECTROMAGNETIC PULSES

[75] Inventor: John Daniel Bishop, Verona, N.J.

[73] Assignee: Lucent Technologies Inc., Murray Hill, N.J.

[21] Appl. No.: 08/866,451

[22] Filed: May 30, 1997

[51] Int. Cl.[7] ............................................. H02H 9/00
[52] U.S. Cl. ........................... 361/58; 361/93.9; 333/17.1
[58] Field of Search .................................. 361/51, 57, 58, 361/59, 60, 77, 79, 87, 93, 111, 118, 143, 146, 147, 159, 93.1, 93.5, 93.9; 333/17.1; 336/30, 70

[56] References Cited

U.S. PATENT DOCUMENTS

| | | | |
|---|---|---|---|
| 4,020,440 | 4/1977 | Moerman | 336/155 |
| 4,731,691 | 3/1988 | Padwa | 361/87 |
| 5,144,308 | 9/1992 | Norsworthy | 341/131 |
| 5,191,331 | 3/1993 | Karema et al. | 341/131 |
| 5,353,309 | 10/1994 | Agazzi et al. | 375/59 |
| 5,410,310 | 4/1995 | Molnar | 341/143 |
| 5,530,442 | 6/1996 | Norsworthy et al. | 341/131 |
| 5,530,443 | 6/1996 | Borgen et al. | 341/131 |
| 5,579,247 | 11/1996 | Kerth et al. | 364/571.02 |
| 5,673,044 | 9/1997 | Pellon | 341/143 |
| 5,712,874 | 1/1998 | Okamoto | 375/243 |
| 5,715,125 | 2/1998 | Neiger et al. | 361/42 |
| 5,768,315 | 6/1998 | Mittel et al. | 375/247 |
| 5,815,102 | 9/1998 | Melanson | 341/143 |

*Primary Examiner*—Ronald W. Leja
*Attorney, Agent, or Firm*—Darby & Darby

[57] ABSTRACT

A circuit is described which maintains the current flowing toward a main circuit within a prescribed limit, regardless of instantaneous voltage or current changes. The circuit includes elements that maintain the current flow in a path toward a main circuit within a prescribed limit by selectively changing the impedance presented in response to any instantaneous change in the voltage flowing toward the main circuit and by introducing into the path a voltage which opposes any such instantaneous change in the current flowing toward the main circuit. Elements may also be provided to protect the main circuit by disconnecting same from a cable leading thereto after signals on the cable have been analyzed and a determination has been made that a signal outside of predetermined upper and lower limit values has been coupled to the cable, for example, from a high altitude electromagnetic pulse. Elements may also be provided to periodically trip and reset the protective circuit before the line to the main circuit is opened, so that an operating mode of the protective circuit can be tested without interrupting the power to the main circuit.

10 Claims, 4 Drawing Sheets

FIG. 5

| COMPONENT/ WAVEFORM PARAMETER | PEAK AMPLITUDE | RISETIME (10 – 90%) | FWHM | TIME TO PEAK | TIME INTEGRAL |
|---|---|---|---|---|---|
| E1 (EARLY – TIME PULSE) | | | | | |
| SHEATH CURRENT | 330 – 480 A | 30 – 37 ns | 180 – 510 ns | 70 ns | 0.2 – 1.3 mA-s |
| SHEATH VOLTAGE | 30 – 62 kV | 20 – 42 ns | 100 – 310 ns | 45 ns | 10 – 580 mV-s |
| CORE CURRENT | 18 – 27 A | 5 – 8 µs | 30 – 63 µs | 11 µs | 0.6 – 12 mA-s |
| CORE VOLTAGE | 1.3 kV | 6.5 – 32 µs | 32 – 50 µs | 15 µs | 0.6 – 0.7 mV-s |
| E2 (INTERMEDIATE – TIME PULSE) | | | | | |
| SHEATH CURRENT | 21 – 77 A | 20 – 64 µs | 0.34 – 0.42 ms | 70 µs | 0.6 – 7 mA-s |
| SHEATH VOLTAGE | 2 – 11 kV | 50 – 210 µs | 0.22 – 0.55 ms | 150 µs | 0.4 – 14 V-s |
| CORE CURRENT | 26 – 120 A | 30 – 230 µs | 0.17 – 1.7 ms | 50 µs | 5 – 360 mA-s |
| CORE VOLTAGE | 3 – 10 kV | 30 – 180 µs | 0.11 – .41 ms | 50 µs | 0.6 – 8.5 V-s |
| INITIAL E3 FIRST LATE – TIME PULSE | | | | | |
| SHEATH CURRENT | 3.2 – 150 A | 0.36 – 0.5 s | 1.2 – 1.4 s | – | 7.5 – 210 A-s |
| SHEATH VOLTAGE | 6.5 – 7 kV | 0.63 – 1.5 s | 2.1 – 4 s | 3.25 | 23 – 30 kV-s |
| CORE CURRENT | 36 – 150 A | 0.36 – 0.5 s | 1.2 – 1.4 s | – | 85 – 210 A-s |
| CORE VOLTAGE | 6.5 – 7 kV | 0.63 – 1.5 s | 2.1 – 4 s | 3.25 | 23 – 30 kV-s |
| LATE E3 (SECOND LATE – TIME PULSE) | | | | | |
| SHEATH CURRENT | 0.8 – 40 A | 11 – 15 s | 38 – 40 s | – | 0.055 – 1.8 kA-s |
| SHEATH VOLTAGE | 8.8 – 9.4 kV | 20 – 21 s | 60 – 65 s | 535 | 625 – 970 kV-s |
| CORE CURRENT | 8.8 – 40 A | 11 – 15 s | 38 – 40 s | – | 0.62 – 1.8 kA-s |
| CORE VOLTAGE | 8.8 – 9.4 kV | 20 – 21 s | 60 – 65 s | 535 | 625 – 970 kV-s |

METHOD AND APPARATUS FOR ATTENUATION OF, AND DAMAGE PROTECTION FROM, HIGH ENERGY ELECTROMAGNETIC PULSES

GOVERNMENT CONTRACT

This invention was made with government support under Contract N0039090-C077. The government has certain rights in this invention.

FIELD OF INVENTION

The present invention relates to a method and apparatus for regulating the current flowing in an a.c. or d.c. circuit and, more particularly, to a protective circuit that attenuates high energy electromagnetic pulses to prevent them from damaging d.c. circuits.

BACKGROUND OF THE INVENTION

Both lightning and the electromagnetic pulse fields resulting from high-altitude nuclear bursts may couple electrical transients in the cables associated with power utility and communication systems. The electrical transients imparted to a cable or other conductor due to either of these sources may have adverse affects on any circuitry that may be connected thereto. Energy from such sources is referred to in the art as "high altitude electromagnetic pulses" (HEMPs). An electromagnetic wave of energy from the atmosphere can couple electrical energy into a power transmission cable. For HEMPs, the amount of energy that may be coupled into the cable is directly related to the length of the cable exposed to the plane wave; in other words, the longer the cable, the greater the coupled energy. This is a first order design parameter for determining the worst case threat condition that may have to be protected against. The susceptibility of a cable system to damage from HEMPs further depends on the type of cable, the energy of the waves, the physical dimensions of the cables' conducting and insulating layers, the electrical characteristics of the cables (including the breakdown voltage of the various insulation layers), and, when the cable is buried, the conductivity (or resistivity) of the ground and the depth at which the cable is buried.

Certain HEMP threats have been characterized by the electrical properties of their respective waveforms. The dominant characteristic of so-called "E1 threats" are their rapid voltage and current rise times ("time to peak"). The dominant characteristic of so-called "E2 threats" is the duration of their voltage and current peaks, i.e., the full-width half magnitude ("FWHM") of the waveform pulses. Another type of threat, the so-called "E3 threat," is characterized by differing initial and late waveforms. The primary concern in protecting a circuit from E3 threats is not the magnitude of the voltage pulse that may be coupled to the cable, but rather the energy, because such waveforms can melt metal. FIG. 5 herein tabulates approximations of the electrical properties of E1, E2, and E3 threats that are important in the art, the data having been obtained from Thevenin open and short circuit equivalents with the voltages being open circuit values that would exist at the terminals of a given cable when immersed in the electromagnetic field produced by a HEMP event and the currents being short circuit values of same. The significance of the data in FIG. 5 is in the order of magnitude of the electrical parameters. The units are specified alongside each entry in the Table, and generally consist of Amperes (A), microseconds ($\mu$s), milliseconds (ms), nanoseconds (ns), Ampere-seconds (A-s), kilovolts (kV), and volt-seconds (V-s). FWHM values provide an indication of how long the pulse exists.

One type of cable for which HEMP protection is important is the deep water trunk (DWT) cable. DWTs connect underwater communications systems to ground-based circuitry located within a terminal equipment building (TEB). An electromagnetic barrier (EMB) within the TEB shields the protected circuitry from many external influences, including energy that may be coupled to the sheath of the DWT cable due to a HEMP. However, the core wire of the cable is electrically connected to a circuit which would be damaged if the HEMP were not attenuated. HEMP protection is required to attenuate such "residual current" to values which meet the specified requirements and which would otherwise pass through the EMB on the cable. In a HEMP protection context, the phrase "residual current" is the attenuated current in any HEMP protected conductor that passes through the EMB wall. Residual current has specified upper bounds in terms of di/dt and the maximum change in current following receipt of an E1 or E2 threat.

Conventionally, HEMP protection has been provided by using voltage limiting devices such as spark gaps, gas tubes, and lightning arrestors which, in effect, apply a short circuit. While such circuits effectively limit voltages to prescribed ranges, currents which are orders of magnitude greater than present during normal circuit operation result from this approach. These techniques are adequate in systems where voltage rather than current is the defined parameter, but not in systems in which current is the defined parameter. One example of a system in which current is the defined parameter is an undersea cable system. Abnormally large currents in such a system may damage, or even destroy, undersea cables as well as the main circuit which is to be protected.

What is needed in the art, and heretofore has not been available, is an ultrafast protection scheme that limits the current flowing toward a main circuit to a prescribed range.

SUMMARY OF THE INVENTION

According to a first aspect of my invention, a circuit is provided which maintains the current flowing toward a main circuit within a prescribed limit, regardless of instantaneous voltage changes. The circuit includes an inductor, a bias supply, and a transformer which has primary and secondary windings, the primary and secondary windings being wound about a common, non-linear core. The secondary winding is serially connected to the main circuit whereas the primary winding, inductor and bias supply are serially connected to one another in a separate circuit which induces a current in the secondary winding which has the opposite polarity and magnitude to the current flowing toward the main circuit in the secondary winding so that the action of the primary and secondary winding currents oppose each other.

According to another aspect of my invention, a method is disclosed for maintaining the current flow in a path toward a main circuit within a prescribed limit value despite any instantaneous changes in voltage. The method comprises the step of selectively changing the impedance presented by a circuit element in response to certain instantaneous changes in the current flowing toward the main circuit. This is done so as to interpose in the path an impedance of relatively high value, which limits the rate of change and the total excursion of the current flowing toward the main circuit. As a result, residual current requirements are maintained within a predetermined range by a change in state from a low series independence to a high series impedance.

According to a further aspect of my invention, a protective circuit is disclosed for protecting a main circuit from voltages that may be coupled to a cable. The protective circuit comprises a sense impedance, a switch, and a window monitor circuit. In a closed state, the switch connects the cable to the sense impedance and provides a current through the sense impedance. In an open state, the switch disconnects the cable from the main circuit and the sense impedance. A drive signal controls whether the switch is in its closed or open state. The window monitor circuit receives the voltage that appears across the sense impedance and compares it to both a predetermined upper limit value and a predetermined lower limit value. The window monitor circuit causes the drive signal to change which, in turn, changes the state of the switch, when a voltage across the sense impedance is beyond the predetermined upper or lower limit values for a predetermined period of time. Such a voltage causes the switch to change from the closed state to the open state, disconnecting the main circuit from the cable. However, in the absence of such a voltage, the switch remains in the closed position, connecting the cable to the main circuit and the sense impedance. The switch may be an electromechanical switch having a first position which corresponds to a closed state and a second position which corresponds to the open state.

According to yet another aspect of my invention, a test circuit is disclosed for initiating a test mode which trips and resets a protective circuit before the line to the main circuit is opened, so that an operating mode of the protective circuit can be tested without interrupting the power to the main circuit. The test circuit comprises a controller which provides a test signal trigger, a test signal generator, and a monitor circuit. The test signal generator is responsive to the test signal trigger and generates a voltage signal waveform sufficient to trip the protective circuit. The monitor circuit indicates whether the protective circuit has been tripped by the voltage signal waveform. The controller also resets the protective circuit, after the protective circuit has been tripped, within a time period insufficient for the tripped protective circuit to affect any circuit connected thereto, e.g., the cable connection to the main circuit.

My invention has utility in any cable system where the main circuit to be protected receives energy through conductive wires in the cable itself, notable applications including cable television and telephone. My invention accepts dynamic changes in voltage but resists changes in the system operating current.

BRIEF DESCRIPTION OF THE DRAWINGS

These and other features and advantages of my invention will be readily apparent from the following detailed description of a preferred embodiment taken in conjunction with the accompanying unscaled drawings, wherein

FIG. 5 is a Table showing typical waveform characteristics of E1, E2, and E3 threats, and specifically shows anticipated magnitudes of such threats.

DETAILED DESCRIPTION OF THE INVENTION

By way of overview and introduction, a protective circuit in accordance with may invention provides protection against the effects of High Altitude Electromagnetic Pulses (HEMPs), as well as from lightning strikes. The protective circuit better ensures that transient currents are bounded, for example, in communication systems. The protective circuit may be located in a well-shielded equipment cabinet (not shown) on an unprotected side of an EMB wall (not shown), receiving its power from a terminal equipment room (TER) (not shown) on the protected side of an EMB wall. The adequacy of HEMP protection may be verified by testing the residual current in any or all conductors passing through the EMB wall for its conformance to the tolerance requirements of a given system. In a typical application, a HEMP threat such as an E1 or E2 waveform will be reduced to an acceptable residual current level if, for example, the residual current pulse due to a HEMP event is less than one ampere and has a rise time of greater than ten microseconds.

A threat or threat condition as used herein refers to a voltage deviation from a quiescent condition. In certain circumstances, such as when E1, E2 or E3 electromagnetic waves are coupled to a communication or power cable, a voltage deviation will be sufficient to raise the current I flowing toward the main circuit to values beyond a prescribed range. In this situation, the voltage due to the threat condition is additive to that which exists during quiescent operation of the main circuit. The threat induced voltage is a.c. in character. The shape of such E1, E2, or E3 waveforms has been predicted and characterized as idealized approximations, as set forth in the Table reproduced as FIG. 5. The waveform characteristics that are most pertinent to my invention concern the energy coupled to the central conductor (the "core") because any induced sheath currents are led directly to ground at the TEB and do not affect the active electronic components.

Figure 1:
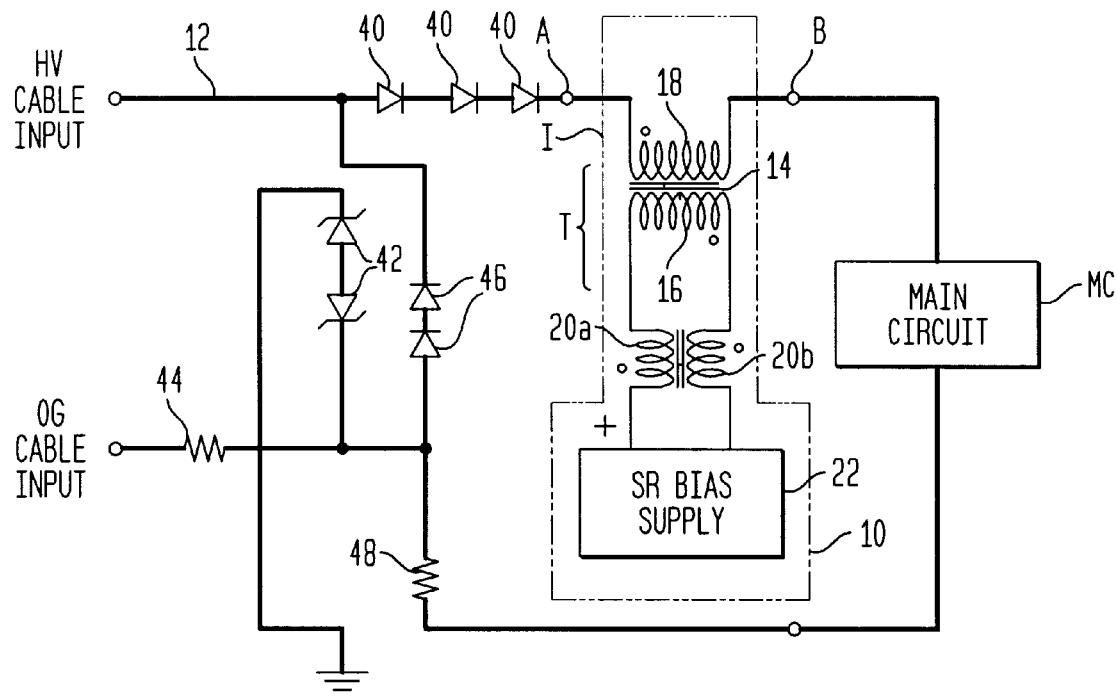
FIG. 1 depicts a schematic diagram of one illustrative embodiment of my invention as applied in a cable system.

FIG. 1 shows the protective circuit 10 having its terminal A connected to an input from a high voltage (HV cable input) side via a series of reverse current blocking diodes 40, and to an ocean-ground (OG cable input) via serially connected voltage clamping diodes 42, arranged in conventional manner, and a current limiting resistor 44. The blocking diodes 40 have values selected to prevent a reversal of current flow when an E3 voltage exceeds the maximum output voltage that can be produced by the cable system power supply located within the main circuit. Diodes 46 prevent an E3 threat from driving the cable power supply into a voltage reversal condition, and sense resistor 48 can be used to cause a switch to open and disconnect the circuit 10 (see switch 102 of FIG. 4 and the discussion of resistor 116). A practical application would preferably have separate protective circuits 10 for each of the high-voltage and ocean-ground sides of the connection, although only one protective circuit is illustrated in FIG. 1. Terminal B of the protective circuit 10 completes the circuit connection to ground through a main circuit MC.

The protective circuit 10 as shown in FIG. 1 is preferably constructed using a transformer T with a nonlinear magnetic core. The transformer has at least primary (for example, first) and secondary (for example, second) windings 16 and 18, the primary and secondary windings being wrapped about a non-linear ferromagnetic core 14. The nonlinear transformer T functions as a current controlled switch that switches between a low impedance state and a high impedance state and, in combination with an inductor, maintains the current flowing through a main circuit MC within the prescribed range. In the absence of a HEMP, the ferromagnetic core 14 of the transformer T is magnetically saturated by a bias current from supply 22. In the saturated state, the series winding impedance has an insignificantly low value (the inductive impedance being in the millihenry range). However, when the current in the winding 18 of the transformer T increases beyond a predetermined threshold value, for example, in response to a HEMP threat, the ferromagnetic core 14 comes out of its magnetically saturated state, and the protective circuit 10 presents a high impedance to the core wire 12 of the cable. Inductance ratios of 1000 between these two states may readily be achieved. Although the current I heading toward the main circuit MC may rapidly assume a value outside of an intended range due to a HEMP, the protective circuit 10 will integrate the voltage changes so that the instantaneous change in current is proportional to the volt-time product. The protective circuit 10 is thus insensitive to waveform artifacts, such as ringing, which otherwise might be introduced due to parasitic circuit elements which are present in the components that are used in any practical circuit. Rather, the protective circuit 10 generates a voltage that opposes the HEMP-induced voltage so that the residual current remains within specified tolerances.

The transformer T has a nonlinear core 14, preferably formed as a square loop. The transformer T is biased ordinarily to be saturated. In response to a HEMP, however, the transformer T comes out of saturation. A suitable core may be constructed from Square 50 alloy available from Magnetic Metals Corporation, Hayes Avenue at 21st Street, P.O. Box 351, Camden, N.J. 08101. The windings are wrapped so as to minimize parasitic capacitance and are wrapped on a toroidal core to provide an opposing voltage, when necessary, which has a rise time of less than a microsecond. Specifically, the invention functions by switching an inductor into the circuit to create a high impedance state when a voltage produced change in current exceeds a set current threshold. Further, the current in the inductor is identical to the circuit current at the instant of switching. The inductor inductance is sized so that the rate of change di/dt of current and the total change in current conform to the residual current requirements.

Figure 2:
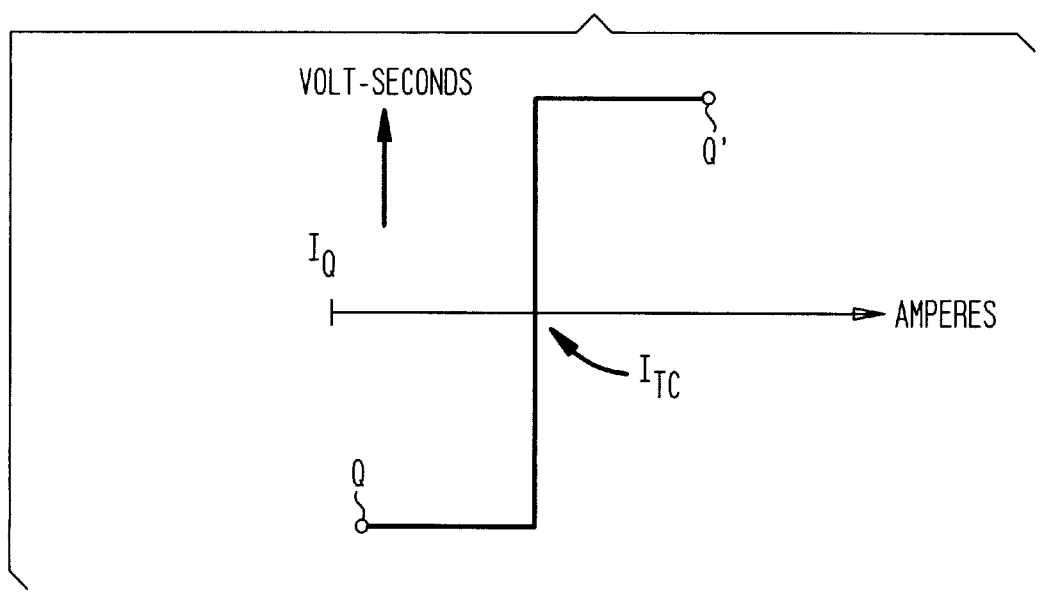
FIG. 2 depicts an idealized plot of the operating characteristic of the switch used in the circuit of FIG. 1.

For switching to occur in response to an increase in the magnitude of secondary winding current, the action of the bias current in the primary winding must be away from the vertical axis and the action of the secondary winding current must be towards the vertical axis of FIG. 2. Referring to the FIG. 2 configuration, the respective actions of the primary and secondary winding currents are always in an opposite sense, and they continue irrespective of the magnetic state of the transformer core. This means that at the instant the core becomes unsaturated there is no discontinuity in the current in either winding. At that instant, the secondary winding current remains that of the main circuit current. Likewise the primary winding current remains at the bias current value. At the instant of switching of the core to an unsaturated state, an inductor is effectively introduced into the secondary winding circuit with a current identical to the secondary winding current at the time of switching. The inductor inductance is that of the primary side inductor multiplied by the square of the transformer turn ratio.

The secondary winding 18 of the protective circuit 10 has its terminals connected in-line with a high voltage side of the main circuit to be protected, that is, between terminals A and B of FIG. 1. The primary winding 16 is series connected to double-wound inductors 20a, 20b and a bias current supply 22. The double-wound inductors 20a, 20b are preferably wound on a common magnetic core with opposite polarities because such a configuration results in a substantial reduction in the effective capacitance of both transformer 14 primary and of inductor 20 windings. The current in the two inductors so arranged is additive, relative to the core. Preferably, inductors 20a and 20b have the same number of turns.

The bias supply 22 in the embodiment of FIG. 1 is configured as a current source having a current output sufficient to saturate the core 14. The value of the current in the secondary winding 18 at which the low to high impedance state change takes place dictates the value of the bias current from the supply 22. The actual bias current is the state change current times the primary to secondary winding turns ratio. The turns ratio is set by the desire to use "low voltage" wiring and components on the primary side (16) of the transformer T. A turns ratio which results in peak voltages that are less than 600 volts, for example, is compatible with contemporary low voltage wiring technology. Currents in the range 1 to 10 amperes may satisfy such a voltage range objective, but the conditions of a given application will ultimately determine the current value. A single bias supply 22 can be configured to supply current to plural transformers T, if present in a particular circuit arrangement.

The turns ratio between the primary and secondary windings 16 and 18 of the transformer T is determined by the ratio of the bias current in the bias supply 22 to the steady state current that will flow in the main circuit (and through the secondary winding 18). Further, the turns ratio is selected to ensure that the quiescent operating point, that is, the point on the hysteresis curve shown in FIG. 2 at which the protective circuit resides when a steady state or quiescent current $I_Q$ is flowing in the main circuit, is at one end of the operating characteristic illustrated in FIG. 2, that is, at either Q or Q', and further to ensure that increases in current due to $E_1$ or $E_2$ threats cause incremental advancements of the operating point towards the vertical axis. The turns ratio may be in the range of about 5:1 to about 15:1, for example.

Referring now to FIG. 2, the quiescent operating point Q on the hysteresis curve is shown at a quiescent current value $I_Q$. During a threat condition, the current heading toward the main circuit may increase to a value $I_{TC}$, where "TC" denotes a threat condition. For the current to increase further, the non-linear characteristic of the transformer T requires that a voltage appear between points A and B of FIG. 1, namely, across the secondary winding 18. FIG. 2 illustrates current versus volt-seconds, that is, the product of the voltage across the secondary winding 18 times the duration of the threat condition. The rapidly changing current due to the HEMP gives rise to a voltage E which appears across the secondary winding 18. The change in current over time is:

$$(di/dt)=(1/L)E(t)$$

where, di/dt is the change in current over time, E(t) is the time-dependent voltage, and L is determined primarily by the value of the inductances 20a, 20b, with regard to the square of the turns ratio between the primary and secondary windings 16 and 18. The difference between the currents in the primary and secondary windings 16 and 18 is directly proportional to the turns ratio.

To oppose a threat condition, the transformer T switches to a high impedance state by becoming unsaturated. The difference in impedance may be typically three orders of magnitude from the impedance of the saturated core, and is due to a reflection of the impedance value of the inductors 20a, 20b in the circuit of the primary winding 16 to the secondary winding 18 which is in series with the main circuit MC.

Figure 3:
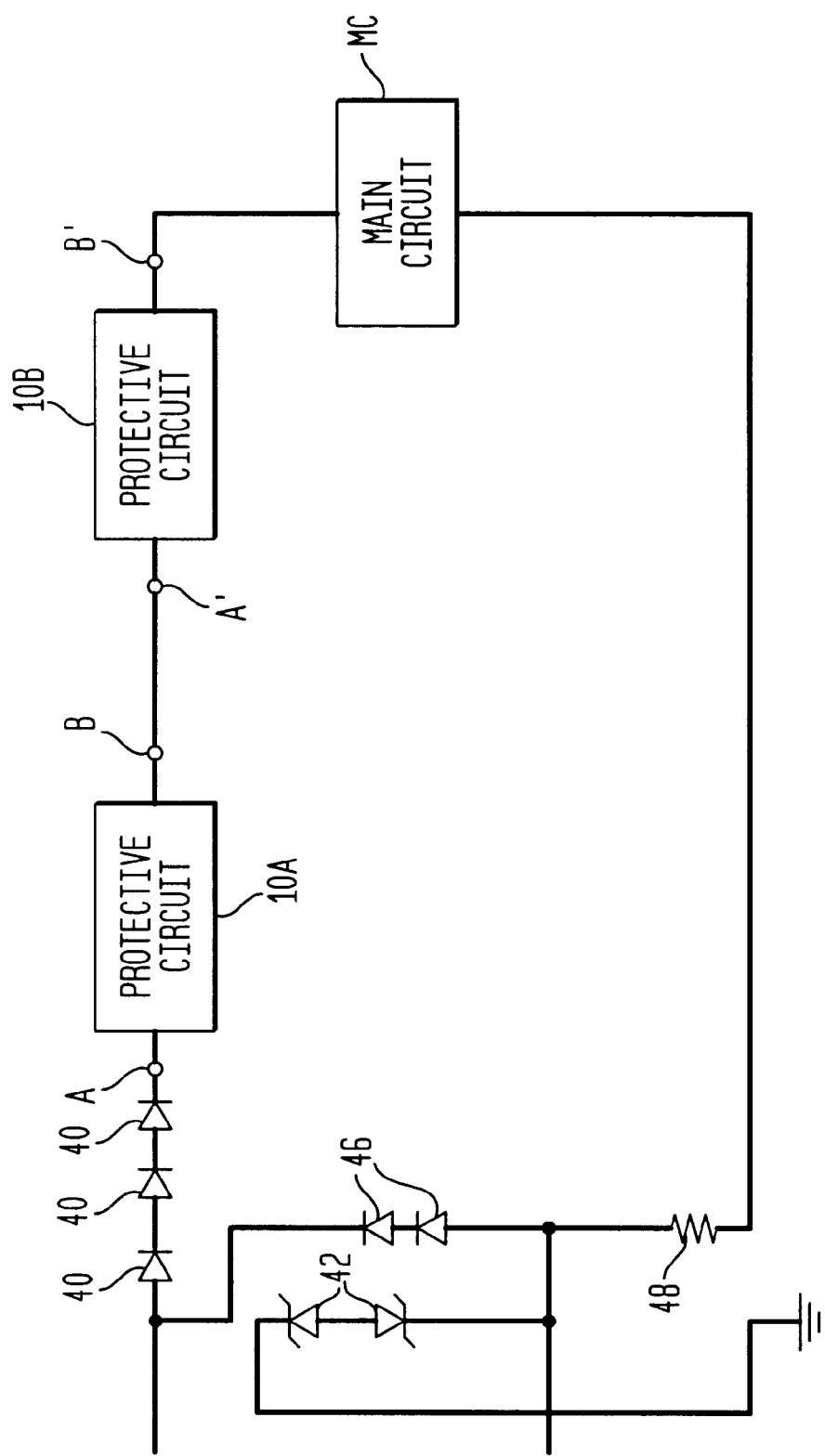
FIG. 3 depicts an alternative arrangement of my invention adapted to provide a wider range of protection to a main circuit.

Plural protective circuits 10 can be provided instead of a single one, as shown schematically in FIG. 3. In such an arrangement, one protective circuit is biased so that increases in current I beyond $I_Q$ due to a HEMP drive the core 14 of the protective circuit 10A out of magnetic saturation and thereby attenuate the current by interposing a high impedance, whereas a second protective circuit 10B is biased so that decreases in current I due to a HEMP drive a core 14' out of magnetic saturation. Such an arrangement uses the plural protective circuits 10 to bound the current I between predetermined upper and lower limit values. In FIG. 3, for example, if the protective circuit 10A restricts the current flowing toward the main circuit MC from exceeding a predetermined upper limit value (between its terminals A and B), the protective circuit 10B would have its bias supply set to restrict the current flowing toward the main circuit MC (between its terminals A' and B') from dropping below a predetermined lower limit value. The additional protective circuit, if biased for secondary winding 18 currents on the other side of zero current would provide protection for an a.c. powered system. The protective circuits 10A and 10B may be serially connected between a PFI filter (see FIG. 4) and the main circuit. Such an arrangement provides a wider range of protection by bounding the current flowing toward the main circuit MC within prescribed and bounded limits both above and below a quiescent current value $I_Q$. Protective circuits 10A and 10B can be provided for each of the high-voltage and ocean-ground sides of the connection, if desired.

The protective circuit 10 reacts to instantaneous changes in current due to E1 and E2 threats by dynamically and selectively changing the impedance that it presents to the input of the main circuit MC (see FIG. 1), and also by introducing an induced voltage which opposes the current due to the threat. The time integral of the threat waveform noted in the Table of FIG. 5 is a first order design parameter. The size of the core 14 of the transformer T, and also the magnitude of the inductors 20a, 20b, that are required in a given application increases directly with the magnitude of the time integral. For example, doubling the time integral will require a core 14 of twice the size and inductors 20a, 20b of twice the value. Also, the peak derivative of the current flowing in the protective circuit 10 is a factor that must be considered in selecting the values for the components in the protective circuit 10, and the geometry of the windings 16, 18 of the transformer T as this affects the parasitic inductance and capacitance of the core 14.

Figure 4:
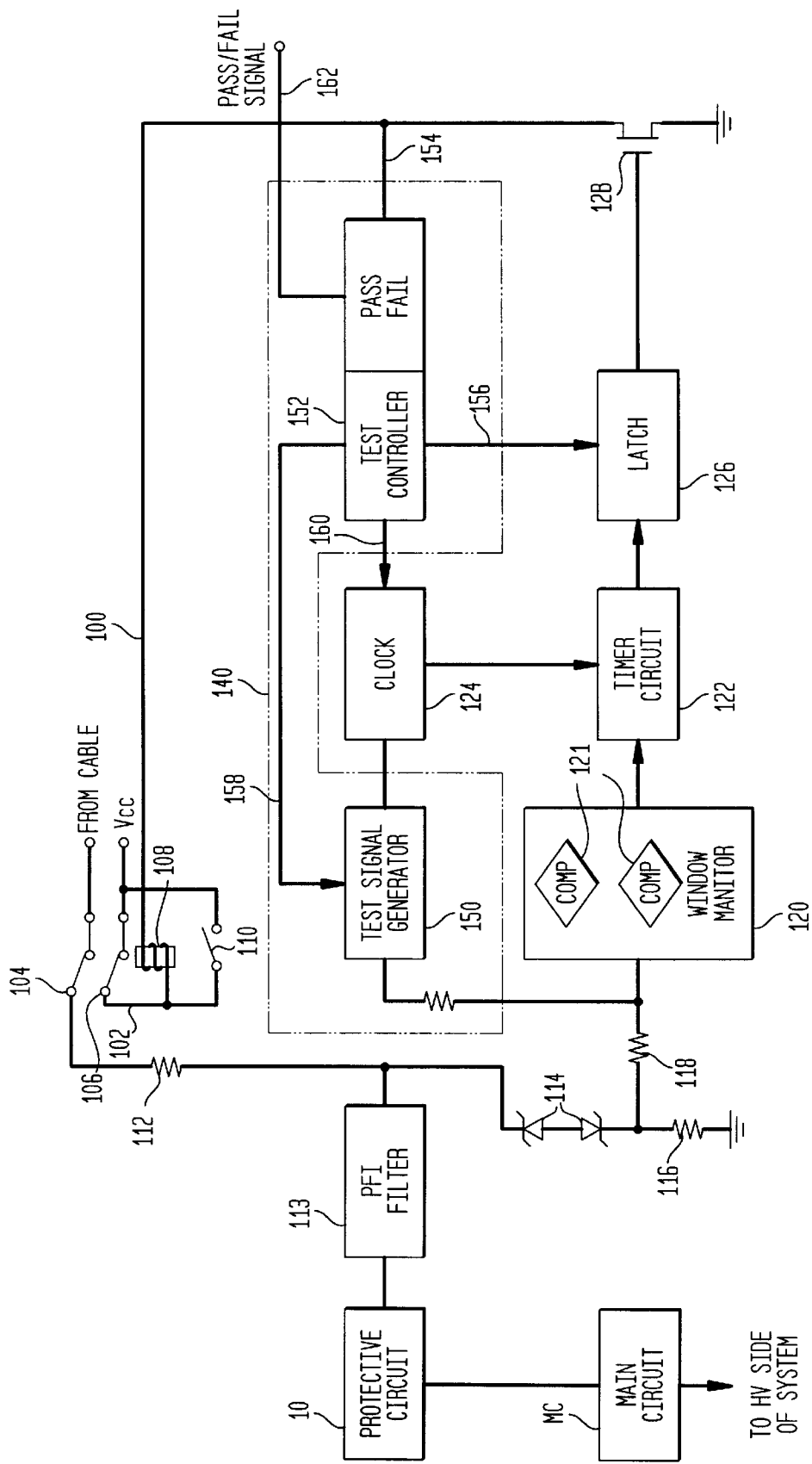
FIG. 4 is a schematic diagram of a protective circuit according to another illustrative embodiment of my invention.

To an extent, the protective circuit 10 can accommodate E3 threats. Because E3 threats appear as a voltage in series with the power path, the cable system power supply acting as a current source will alter its output voltage in proportion to the magnitude of the E3 voltage in order to maintain constant current in the power path. This will ensure a constant current output for opposing polarity E3 voltages which are (1) as great as the supply voltage's maximum cable system power rating, or (2) for aiding polarity E3 voltages equal to the normal system working voltage. (E3 voltages can be of either polarity.) Further increases in the E3 voltage require isolation of the main circuit and the protective circuit 10. However, E3 threats can be fully accommodated according to my invention by isolating the protective circuit 10 and the main circuit from incoming energy using a protective circuit 100, which includes a switch or relay 102 disposed ahead of both the protective circuit 10 and the main circuit, in order to block E3 threats, as shown in FIG. 4. When an electromechanical switch is selected for the switch 102, it typically has a response time less than ten milliseconds, and is able to standoff voltages of 50,000 volts or higher in the open contact (off) state. Together, the protective circuits 10 and 100 provide protection against plural types of threats from electromagnetic waves that may be coupled to a cable and conveyed to a circuit.

The protective circuit 100 of FIG. 4 in accordance with my invention has a series of discrete functional blocks which (1) protect downstream circuits such as the main circuit MC and the protective circuit 10, (2) ensure that the protective circuit 100 will (a) always work when it is supposed to, and (b) not trigger falsely and thereby take the main circuit MC off-line at an inappropriate time, and (3) bound currents flowing toward the main circuit MC within prescribed limits. One of ordinary skill in this art would appreciate that the circuit can be implemented using integrated circuitry so long as it is not connected to the high voltage handling components of FIG. 4.

With further reference to FIG. 4, the electromechanical switch 102 has main contacts 104 including a first position in which signals on a cable, for example, from either an ocean-ground side or a high voltage side, are connected in series to a current limiting resistance 112, PFI filter 113, a protective circuit 10 and the main circuit 10. In addition, the main contacts 104 are connected through resistance 112 and diodes 114 to the junction of a resistance 116 to ground and a sense impedance 118. The PFI filter 113 is conventional and optional, and forms no part of my invention. In a second position the contacts 104 disconnect the cable from the sense impedance 118. Auxiliary contacts 106 are also provided for selectively connecting a supply voltage Vcc to the actuating coil 108 of the switch 102 to a FET 128. The supply voltage Vcc powers the protective circuit 10 and perhaps also the main circuit MC. The switch 102 controls its contacts 104, 106 between their first and second positions in response to a drive signal applied to FET 128 as discussed below. A manual switch 110 is further provided to permit a manual reset of the switch 102 in the event that manual override of the electromechanical switch 102 is desired.

Because the electromechanical switch 102 will shut down the main circuit by isolating it, it is preferred that the switch 102 be part of a larger protective circuit 100 which is designed to be generally immune to spurious signals, such as energy coupled from lightning strikes or power-line faults. A high-order low-pass analog filter may be used to limit the frequency response of the system to a desired range and thereby prevent false triggering. It is preferred that a time-domain based circuit be used for such filtering because such circuits provide high performance with superior noise immunity. Such a circuit compares incoming signals to a predefined threshold value for a predetermined period of time. If the incoming signals do not have an anticipated waveform, for example, the known waveform characteristics of a signal resulting from a lightning strike or power line fault, then the circuit merely measures the next incoming signal without isolating the main circuit MC. Otherwise, the circuit will be tripped and the main circuit MC will be isolated (along with the protective circuit 10).

In order to determine whether a signal carried by the cable contains an E3 threat, the circuit 100 generates an E3 sense signal, which senses the presence and absence of an E3 threat at any given time. Avalanche diodes 114 clamp the voltage at the PFI Filter input to within a preselected range, for example, −100 V to 100 V, and a current flows through a preferably low ohmic value sense impedance 116. After passing through a test injection impedance or buffer impedance 118, the E3 sense signal is provided to the input of a window monitor circuit 120 which determines whether the signal is outside of a predetermined range. If it is, the output of the window monitor circuit 120 triggers a timer circuit with a logic-level pulse (and most preferably, a logic-high pulse) applied to a trigger pin of the timer, which pulse remains at that level until the E3 threat signal comes within the predetermined range. As understood by those skilled in the art, the window monitor circuit 120 may comprise dual comparators 121 for comparing the E3 sense signal to a limit value at either end of the predetermined range. The predetermined range is defined by a predetermined upper limit value and a predetermined lower limit value.

When comparators 121 are used, it is preferred that the predetermined upper limit value be connected to a non-inverting polarity input terminal of one comparator and that the predetermined lower limit value be connected to an inverting polarity input terminal of the other comparator; the voltage across the sense impedance 116 is provided to the other input terminal of the respective comparators 121.

In the embodiment of FIG. 4, a timer circuit 122 serves as both the timing device and a signal generator for causing a latch 126 to latch. Preferably, a programmed counter, having a number programmed into its register, is used as the timing device. A clock 124 causes the counter to count down from the programmed number toward a second number at its operating frequency, for example one kilohertz. Of course, other devices may be used for the timer circuit 122 so long as they are able to gauge the passage of time, alone or in conjunction with a signal generator for latching the latch 126.

If during the count the E3 sense signal is no longer beyond the predetermined range, the counter will be reset to its preset or programmed value. This occurs when the E3 sense signal is not representative of a true E3 threat, that is, when the E3 sense signal lacks the characteristics of a circuit-threatening waveform (such as one having a voltage outside of a predetermined range for a predetermined period of time). Otherwise, the E3 sense signal will have sensed a threat and the counter will continue to count down until it reaches zero. Resetting the timer circuit 122 may be achieved, for example, by connecting the timer circuit trigger to a reset pin of the timer circuit as well as to the trigger pin of the timer. Because the timer circuit trigger falls to a logic-low level when the E3 threat signal returns to a value within the range of acceptable values, the falling edge of the trigger signal can be used to reset the timer circuit 122. Of course, other ways can be used to reset the timer circuit 122, as understood by those of ordinary skill in the art.

Assuming that the E3 sense signal was outside the predetermined range for the entire time that the counter 122 was counting, the timer circuit 122 will output a latch signal which causes the latch 126 to apply a logic-low signal to the gate control terminal of FET 128. Instead of a FET, an insulated gate bipolar junction transistor or equivalent device could be used. The relay coil 108 of the electromechanical switch 102 ordinarily is energized by a voltage drawn through it from supply voltage Vcc and contacts 106, and discharged to ground through FET 128, which is normally in an on (conducting) state. However, when a logic-low signal is applied to the gate control terminal of the FET 128, the FET 128 no longer conducts and one end of the relay coil 108 is no longer connected to ground potential, but instead is "floating." As a result, the drive signal for the relay coil 108 is reduced or eliminated which causes the contacts 104, 106 to open. Consequently, when the latch 126 grounds the gate control terminal of the FET 128 and causes the FET to stop conducting, the contacts 104 open and the cable is isolated from the main circuit MC. On the other hand, if the E3 sense signal does not have the anticipated waveform characteristics (voltage level range and time duration), the counter does not reach zero, the magnitude of the voltage signal from the latch is not sufficient to stop the FET from conducting, the relay coil 108 remains energized, and the contacts 104 remain closed.

As understood by those skilled in the art, the FET 128 alternatively could be configured so that the relay coil 108 is de-energized when the FET is switched to a conducting state. Also, the switch 102 alternatively could be implemented using solid state circuitry, for example, FETs.

Once the switch 102 has been opened, it can be reset when the E3 threat has disappeared by manually closing switch 110. This causes current to flow from Vcc through the coil 108 to ground through FET 128. Once closed, the sense resistor 116 receives the proper signal from the cable, the window monitor 120 sets to the proper state to hold FET 128 in the conducting state.

FIG. 4 also illustrates an optional test circuit 140 which may operate automatically and periodically to test the circuit 100 to ensure that it will operate properly when a true E3 threat is sensed. During a test mode, the system clock 124 is accelerated by a known factor, for example, ten times its ordinary rate. At the increased clock rate, the timer circuit 122, for example, the counter, operates at a correspondingly faster clock rate. Further, a test signal generator 150 generates a voltage signal that is superimposed onto the input of the window monitor 120 to simulate an E3 threat signal, in response to a test signal trigger from a test controller 152. The voltage signal from the test signal generator 150 ensures that the signal received at the input of the window monitor circuit 120 is outside the predetermined upper and lower limit values. This causes the counter to count down and eventually causes the FET 128 to turn-off, via latch 126. The test controller 152 may also monitor the test signal generator 150 and the drive voltage value at the drain terminal of the FET 128 via a line 154.

If the test controller 152 observes a change in the drive voltage value, the test is successful (pass), the latch is reset via reset line 156, the test signal generator is turned-off via line 158, and the clock is reset to its normal operating frequency via line 160. If on the other hand the test controller 152 does not result in a sufficiently large change in the drive voltage, the test is unsuccessful (fail), and an alert signal on line 162 advises a system operator of a circuit "fail" condition instead of a circuit "pass" condition.

By monitoring the drain voltage of the FET 128, the system can ensure that the circuitry has not degraded, that is, that drain voltage swings on the order of Vcc are observed.

Importantly, the duration of the test signal during the test mode is short (less than a millisecond) at the increased clock rate compared to the switching time of the electromechanical switch 102 (about 10 milliseconds), and so the test may be performed without ever isolating the main circuit MC. By way of comparison, the same waveform as generated by the test signal generator at the normal clock rate during an operational mode would cause the contacts 104, 106 to change positions (for example, from closed to open). However, the coil 108 is too slow to open the contacts 104, 106 in the short time that the latch turns-off the FET 128 at the enhanced clock rate. Thus, the drive signal emitted by the FET 128 can be monitored by the test circuit, with appropriate changes in its value indicating that the E3 protective circuit 100 is functional without affecting the circuitry connected to the protective circuit 100.

The foregoing optional test circuit delays the detection of a true E3 threat only by the short amount of time necessary to conduct the test at the accelerated clockrate.

Optionally, the waveforms for an E1 and/or E2 pulse, as characterized in the Table of FIG. 5, can be simulated using conventional circuit elements and manually or periodically input to the input terminal A of the protective circuit 10 for testing the continued operability of the circuit. For example, such a waveform can be injected by a circuit serially connected between the blocking diodes 40 and terminal A of the protective circuit.

In a practical application, the switch 102 has its signal input connected to the cable or conductor, for example, a DWT cable, and its output connected to a power frequency interference (PFI) filter which attenuates power frequency components of incoming signals. The PFI filters the signals going to the protective circuit 10. The secondary winding 18 of the transformer T would be serially connected to the PFI, so that the signals pass through the winding between terminals A and B to thereby control the current flowing into the main circuit MC, on the other side of the EMB wall. A wide-band clean-up filter would perform a final stage of filtering before any signals pass through the EMB wall. The control circuit 100 would periodically test the operability of the switch 102 without causing the signals to be isolated from the main circuit MC.

While my invention has been particularly shown and described with reference to the preferred embodiments thereof, it will be understood by those skilled in the art that various changes in form and detail may be made therein without departing from the spirit and scope of my invention.

What is claimed:

1. A circuit for protecting a main circuit from a plurality of electromagnetic waves that constitute a threat to the main circuit, and which may be coupled to a cable connected thereto, by restricting the current flowing toward the main circuit, comprising:

a first wave-responsive circuit comprising:
      sense impedance;
      a switch having a closed state in which the cable is connected to the main circuit and to said sense impedance and provides a current therethrough, and an open state in which the cable is disconnected from the main circuit and said sense impedance, said switch being controllable between said closed and opened states in response to first and second respective values of a drive signal;
      a window monitor circuit receiving a voltage across said sense impedance in response to the current therethrough, comparing it to a predetermined upper limit value and a predetermined lower limit value, and causing said drive signal to have the second value when the voltage across said sense impedance is beyond said predetermined upper or lower limit values for a predetermined period of time and to have the first value otherwise; and a second wave-responsive circuit comprising:
      a transformer having a first coil and a second coil, said first and second coils being wound about a common non-linear core, said second coil being serially connected between the cable and the main circuit;
      an inductor; and
      a bias supply, said first coil, inductor and bias supply being serially connected to one another to generate an induced voltage in said second coil which has the opposite polarity and magnitude as the voltage flowing toward the main circuit.

2. The circuit of claim 1, wherein said transformer has a magnetically saturable core and said bias supply drives said core into saturation under quiescent conditions, and an electromagnetic pulse wave induced in said cable draws said core out of saturation, whereby its impedance is changed.

3. A circuit which maintains the current flowing in a cable toward a main circuit load within a prescribed limit regardless of instantaneous voltage changes, comprising:

a transformer having a first coil on a primary side of the transformer and a second coil on a secondary side of the transformer, said first and second coils being wound about a common non-linear core, said second coil being serially connected between the cable and the main circuit load on the secondary side of the transformer;
   an inductor; and
   a bias supply,
   said first coil, inductor and bias supply being serially connected to one another on the primary side of the transformer to generate an elecromagnetically induced voltage in said second coil on said secondary side of the transformer which has the opposite polarity and magnitude as the voltage flowing toward the main circuit load.

4. The circuit of claim 3, wherein said transformer has a saturable core and said bias supply drives said core into saturation under quiescent conditions, and an electromagnetic pulse wave induced in said cable draws said core out of saturation, whereby its impedance is changed.

5. The circuit of claim 3, wherein said second coil has more turns than said first coil.

6. The circuit of claim 3, wherein said inductor comprises first and second inductors wound with opposite senses about a common core.

7. The circuit of claim 3, wherein said bias supply is a constant current source.

8. A test circuit for initiating a test mode which trips and resets a protective circuit which operates at a normal operating frequency using a clock circuit so that an operating mode of the protective circuit can be tested, comprising:

a controller which provides a test signal trigger and a clock accelerator signal, the clock accelerator signal causing the clock circuit to operate at accelerated rate;
   a test signal generator responsive to said test signal trigger which generates a voltage signal waveform sufficient to trip the protective circuit while the clock circuit is operating at the accelerated rate; and
   a monitor circuit which indicates whether said protective circuit has been tripped by said voltage signal waveform;
   said controller resetting said clock circuit to said normal operating frequency and said protective circuit after it has been tripped within a time period insufficient for the tripped protective circuit to affect any circuit connected thereto.

9. The test circuit as in claim 8, wherein said controller provides the test signal trigger automatically and periodically.

10. The test circuit as in claim 8, wherein said controller controls the protective circuit to operate in the test mode at a rate faster than when it is in the operating mode.

* * * * *